United States Patent [19]

Janutka

[11] Patent Number: 5,729,067
[45] Date of Patent: Mar. 17, 1998

[54] METHOD AND APPARATUS FOR CLOSED LOOP POSITION CONTROL IN A LINEAR MOTOR SYSTEM

[75] Inventor: William J. Janutka, West Allis, Wis.

[73] Assignee: Eaton Corporation, Cleveland, Ohio

[21] Appl. No.: 521,613

[22] Filed: Aug. 30, 1995

[51] Int. Cl.⁶ ............................... H02K 41/00; H02P 1/46
[52] U.S. Cl. ........................... 310/135; 310/12; 310/268; 318/635; 318/636; 318/254
[58] Field of Search ................................ 310/12, 13, 14, 310/268, 135; 318/135, 636, 635, 560, 268; 360/78

[56] References Cited

U.S. PATENT DOCUMENTS

| | | | |
|---|---|---|---|
| 3,710,086 | 1/1973 | Lahde et al. | 235/150.2 |
| 4,282,467 | 8/1981 | Gruesbeck | 318/561 |
| 4,446,410 | 5/1984 | Yagura et al. | 318/687 |
| 4,455,512 | 6/1984 | Cornwell et al. | 318/135 |
| 5,134,335 | 7/1992 | Ikemoto et al. | 310/328 |
| 5,218,277 | 6/1993 | Pattison et al. | 318/135 |
| 5,227,709 | 7/1993 | Gauthier et al. | 318/685 |
| 5,434,459 | 7/1995 | Pinkerton | 310/20 |
| 5,455,495 | 10/1995 | Bec | 318/560 |
| 5,519,301 | 5/1996 | Yoshida et al. | 318/811 |

*Primary Examiner*—Thomas M. Dougherty
*Assistant Examiner*—Timothy A. Williams

[57] ABSTRACT

An improved method and servo control apparatus (C) is provided for controlling the motion of a linear electric motor (A) which in turn generates motion command signals to various apparatus such as a hydraulic steering system (B). Preferably, the servo control apparatus (C) includes a power supply circuit (60), a servo amplifier circuit (62), a pulse width modulation circuit (64), an H-bridge drive circuit (66) and an inductive position sense circuit (68). The voltage at a node (42) between coil pairs (38, 40) in the motor (A) is sensed and synchronously demodulated using transmission gates (222, 224) to develop a DC signal representative of armature (30) position from a center location. The signal on a current shunt resistor (200) is synchronously demodulated by transmission gates (208, 209) to generate a signal, the phase of which is determined with respect to the motor drive signal. The phase signal directly indicates whether the armature is off center towards drive coil 38 or drive coil 40.

19 Claims, 7 Drawing Sheets

METHOD AND APPARATUS FOR CLOSED LOOP POSITION CONTROL IN A LINEAR MOTOR SYSTEM

BACKGROUND OF THE INVENTION

This invention pertains to the art of electronic servo control systems and more particularly to apparatus for precisely controlling the position of a linear electric motor armature which may be connected to a slave mechanical or hydraulic apparatus such as a power steering system of a motor vehicle. The invention is specifically applicable to armature position control in a series connected twin coil linear electric motor or solenoid and will be described with particular reference thereto. It will be appreciated, though, that the invention has broader application such as armature position control in both rotary and linear electric motors having one or more separately or collectively excitable driving coils disposed therein.

Prior to the present invention, feedback for use in the position or velocity control loop of linear servomotors or actuators was derived from a separate sensing device connected in some manner to the motor armature. One simple approach has been to connect the wiper arm of a slide potentiometer to the motor armature and allow it to move in unison with the armature while the potentiometer housing itself is held in a spatially fixed location or orientation. The varying resistance observed by a servo system connected to the wiper arm provides an indication of armature position. Velocity and acceleration signals are mathematically derivable directly from the position measurements over time using techniques well known in the art.

One such system which uses this method is shown in U.S. Pat. No. 3,870,931 to Myers. There, an external potentiometer is mounted on a bracket and includes an axially slidable member affixed to a sliding center tap providing position-dependent resistance measurements. The motor armature is connected to the slidable member and the center tap is electrically coupled to an electronic feedback circuit.

Although somewhat crude in implementation, the Myers system provides closed loop position control over the motor armature. However, the costs associated with the potentiometer feedback sensor, both in terms of increased device hardware expense and additional manufacturing/assembly burdens, render this type of control approach somewhat expensive. Further, the external potentiometer is somewhat large physically and is, therefore, undesirable in space-sensitive applications. Lastly, although perhaps the most significant limitation of potentiometer-type position feedback systems, is the inherent possibility that one or more of the windings or wiper arm of the potentiometer may become contaminated in harsh environments and/or wear out due to continued use. After any such catastrophic event occurs, feedback and servo control is lost.

U.S. Pat. No. 4,616,153 to Lee provides a partial solution to the problems associated with potentiometer-type feedback arrangements in linear electric motor systems. There, a sub-system is provided within the shell or casing of the linear electric motor for sensing the position of the armature relative to the stator. A first set of direct current windings comprise the primary coils of the Lee servomotor and are disposed within the shell to generate a magnetic field urging the armature into linear motion. Separate and distinct feedback windings adjacent the motor armature sense its position. In motor nomenclature, the feedback windings are referred to as secondary windings.

The degree of interaction or magnetic coupling between the primary or motivational windings and the secondary or feedback windings is determinative of the armature position. Although the Lee servo system includes advantages over the Myers system, extra windings are needed within the motor casing adding to its overall cost and manufacturing difficulty.

It is, therefore, desirable to provide a simple and dependable armature position servo system for use in a linear electric motor. Such a new servo system would be universally adaptable to all types of linear electric motors including post manufacture situations if the primary windings themselves could be used to detect armature position by multiplexing their use alternately between position command and feedback functions.

SUMMARY OF THE INVENTION

The present invention contemplates a new and improved servo system method and apparatus for use with linear or rotary electric servomotors which overcomes the above-referenced problems and others and provides system designers, integrators and developers the ability to universally retrofit servo control to an installed base of linear electric motors or servomechanisms as well as to design new electromechanical systems with inexpensive, accurate and reliable control.

According to the present invention, an electric servo control system is provided for both generating an armature motion command signal in a first set of motor coils during a first period and detecting the armature position using the same first set of coils during a second time period.

According to a method of developing a position feedback signal in the electric servo control system of the present invention, a first current flow is generated through a pair of coils in a linear actuator for a first time period, a second current flow is generated through the pair of coils for a second time period, a first voltage signal is sensed at a node between the pair of coils during the first time period, a second voltage signal is sensed at the node between the coils during the second time period, and the first and second voltage signals are combined to develop the position feedback signal.

According to a more limited aspect of the invention, the first and second time periods are overlapping.

According to yet another aspect of the present invention, a pulse width modulation circuit is used to generate a motion command signal during the first time period. An inductive position sense circuit is used during the second overlapping period to detect the armature position using residual flux linkages.

According to a still further aspect of the invention, a pulse width modulation circuit is compensated to adapt for use with a wide variety of power supply voltage ranges. This makes the system rugged.

A primary advantage of the invention resides in its ability to be applied to linear or rotary electric servo actuators externally thereof without the need for internal modification. This makes retrofitting easy.

Another advantage of the invention is the savings in cost and physical size resulting from the utilization of the driving coils for a dual purpose: generating a magnetic field to induce armature motion and sensing the armature position based on inductance principles. This makes the system lightweight and inexpensive.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENT

While the present invention will be described hereinafter in connection with the preferred embodiment thereof, it will be understood that the description is not intended to limit the invention to that embodiment or embodiments. On the contrary, it is intended to cover all alternatives, modifications and equivalents as may be included in the spirit and scope of the invention as defined by the appended claims. As an example, although the preferred embodiment illustrated shows an analog circuit including linear discrete components, it is within the scope of this application to include equivalent microprocessor based digital or analog and digital combination servo control systems. The various control program operating parameters would be preferably stored in RAM memory in order that they may be adjustable to adapt the control to a wide range of applications.

Figure 1:
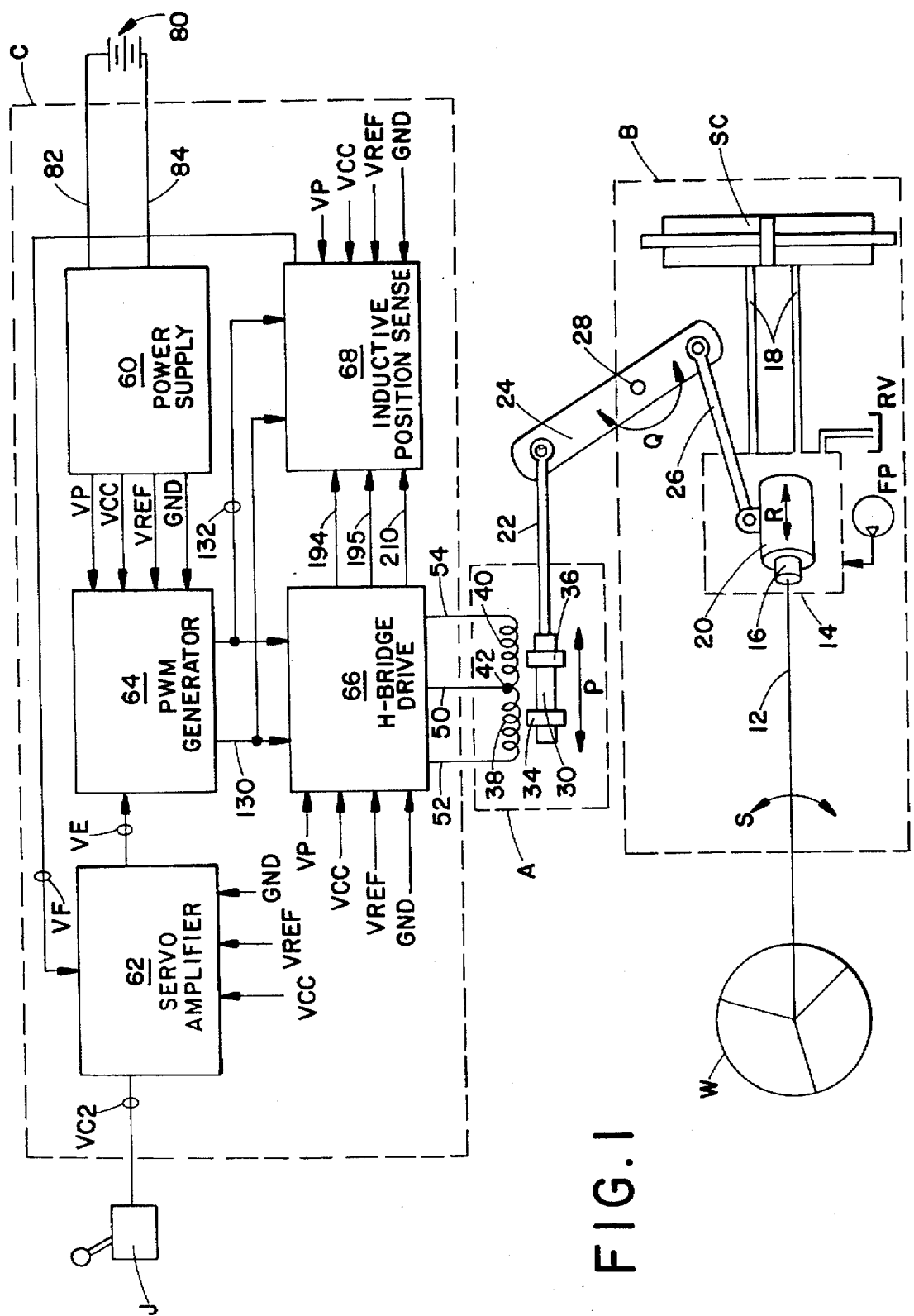
FIG. 1 is a schematic view of the subject invention connected to an operatively associated fluid control valve of the type used for hydraulic steering of a vehicle.

For a general understanding of the features of the invention, the preferred embodiment is shown in FIG. 1 of the drawings applied to a vehicle hydrostatic power steering system of the type shown in U.S. Pat. Nos. 5,016,672, 5,115,640 and 5,329,969 all of which are assigned to the assignee of the present invention and incorporated herein by reference. In the drawings below, like reference numerals have been used throughout to designate identical elements.

For the purpose of simplifying the discussion to follow and to more directly focus on the invention at hand, FIG. 1 schematically depicts only a portion of an overly-simplified hydraulic steering system including the electromagnetic servo mechanism coupled to an electronic control apparatus according to the present invention. A more complete description of the preferred exemplary steering system, actuator and connecting linkage can be found in the '969 patent identified above and incorporated herein. Although the system shown in FIG. 1 is specifically intended for use in a hydraulic steering system of a large farm or heavy construction vehicle, the present invention finds utility in a variety of industrial or other equipment incorporating linear or rotary servomotors for electromagnetic actuation of mechanical or electric controls.

Broadly, as illustrated in FIG. 1, the apparatus generally comprises a servo actuator which effects a controlled position of, or rate of movement in, an operatively associated external mechanical system along a path indicated generally by the arrow P. In the preferred application illustrated, the servo actuator is any type of generic linear electric motor A such as, for example, that shown in U.S. Pat. Nos. 3,870,931 or 4,358,691. The motor A is mechanically connected to an elongate annular sleeve used in a hydraulic steering system B of the type described in the above-incorporated patents assigned to the assignee of the instant application. The linear electric motor A is controlledly actuated by a servo control apparatus C of the present invention which receives an electronic command input from a joystick J representative of a desired steering position.

For a complete understanding of the novel features and advantageous results deriving from the present invention, a brief discussion of this preferred steering system application follows below.

With continued reference to FIG. 1, a preferred application of the control apparatus and method of the present invention is in association with the hydraulic steering system B. The system shown in a somewhat pictorial schematic includes a fluid pump FP which receives fluid from a system reservoir RV and directs pressurized fluid to a fluid controller or valve, generally designated 14, The controller 14 directs metered, pressurized fluid to a steering cylinder SC, normally in response to rotation of a steering wheel W. Overall in the system illustrated, the operator can control the flow of pressurized fluid from the pump FP through the controller 14 to the steering cylinder SC either by means of the steering wheel W or the joystick J.

An elongate steering shaft 12 connects the steering wheel W to the fluid control valve 14 which in turn communicates variable fluid pressures between the pump FP and cylinder SC through high pressure hydraulic lines 18. As illustrated in the FIGURE, the steering shaft 12 is rotatable in a direction S to effect fine positioning of downstream mechanical steering linkages using a spool 16 in the fluid controller 14. This operation mode is often referred to as a "roading" mode. For gross steering positioning maneuvers such as may be used in farm or construction vehicles for quick turns in a "working" mode, a longitudinally slidable sleeve 20 in the control valve 14 is operated by means of the joystick J and servo control apparatus C in order to quickly supply ("dump") large quantities of hydraulic fluid to the steering mechanism from the pump FP, as described in the above-incorporated patents.

In the preferred implementation of the instant invention, the slidable sleeve 20 is connected to a drive member 22 through a mechanical torque multiplier illustrated generically as a rotatable crank 24 and connecting link 26. The crank 24 is rotatable about a fulcrum or pivot point 28 in a direction Q and may provide a mechanical displacement gain or a torque advantage as illustrated in the FIGURE. Although other configurations are possible, the slidable sleeve 20 is controlledly positioned as the drive member 22 moves together with the servo actuator in the direction P causing rotational movement of the crank 24 in a direction Q and in turn linear motion of the sleeve along direction R through the connecting link 26. Many forms of torque multipliers or other interface devices for achieving a mechanical gain or torque advantage, or both, between the motor A and controlled system B will occur to those skilled in the art.

Figure 2:
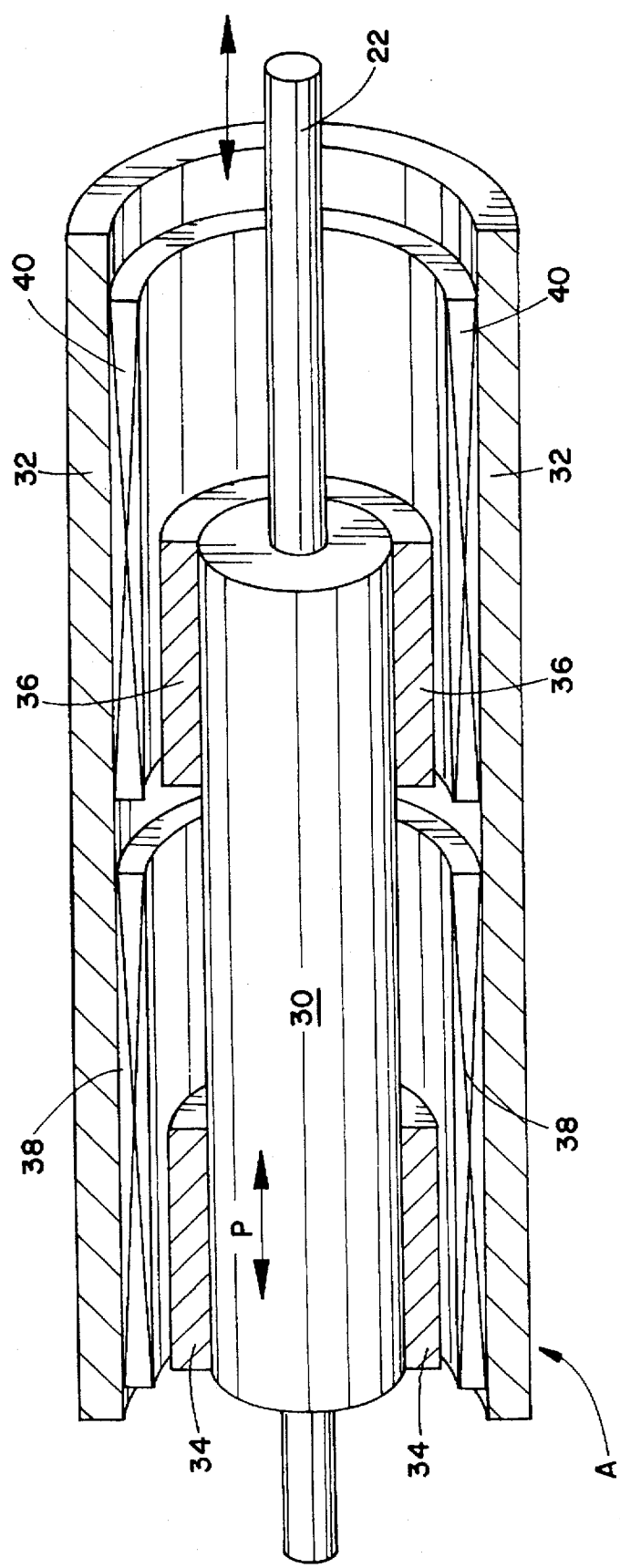
FIG. 2 is a cross-sectional view of a preferred linear electric motor for use in combination with the subject invention.

With reference now to both FIGS. 1 and 2, the linear electric motor A, shown in cross-section in FIG. 2, includes a linearly positionable steel armature 30 which is generally cylindrical and surrounded by an outer cylindrical steel case 32. A pair of axially spaced apart magnets 34, 36 are circumferentially disposed on the cylindrical armature 30. The pair of magnets 34, 36 interact with a corresponding pair of spaced apart coils 38, 40 which are circumferentially interiorally disposed on the steel case 32. The armature 30 is mechanically connected to the drive member 22 such that linear motion of the armature in a direction P causes a corresponding linear motion of the sleeve 20 in the direction R. The armature 30 is carried on suitable bearings (not shown) in a well-known manner in order to maintain a predetermined air gap between the coils and magnets and to prevent mechanical interference or contact between the pair of magnets 34, 36 and the pair of coils 38, 40.

Electrical connection between the spaced apart pair of coils 38, 40 is preferably accomplished as illustrated in FIG. 1 wherein one lead of each coil is connected together at a common tap 42 which communicates with the servo control apparatus C through a lead wire 50. Each of the remaining leads of the pair of coils 38, 40 are electrically connected to the servo control apparatus through separate lead wires 52, 54.

Thus, in the preferred embodiment illustrated, the servo control apparatus C is used in combination with a linear motor having series connected primary drive coils. Of course, the combination with other type electric motors, such as rotational torque motors, having alternative but equivalent coil arrangements is possible and contemplated within the scope of this description.

The general topology of the servo control apparatus C includes a power supply circuit 60, a servo amplifier circuit 62, a pulse width modulation PWM generator circuit 64, an H-bridge drive circuit 66, and an inductive position sense circuit 68. Each of these will be described in turn in detail below.

POWER SUPPLY CIRCUIT

Figure 3:
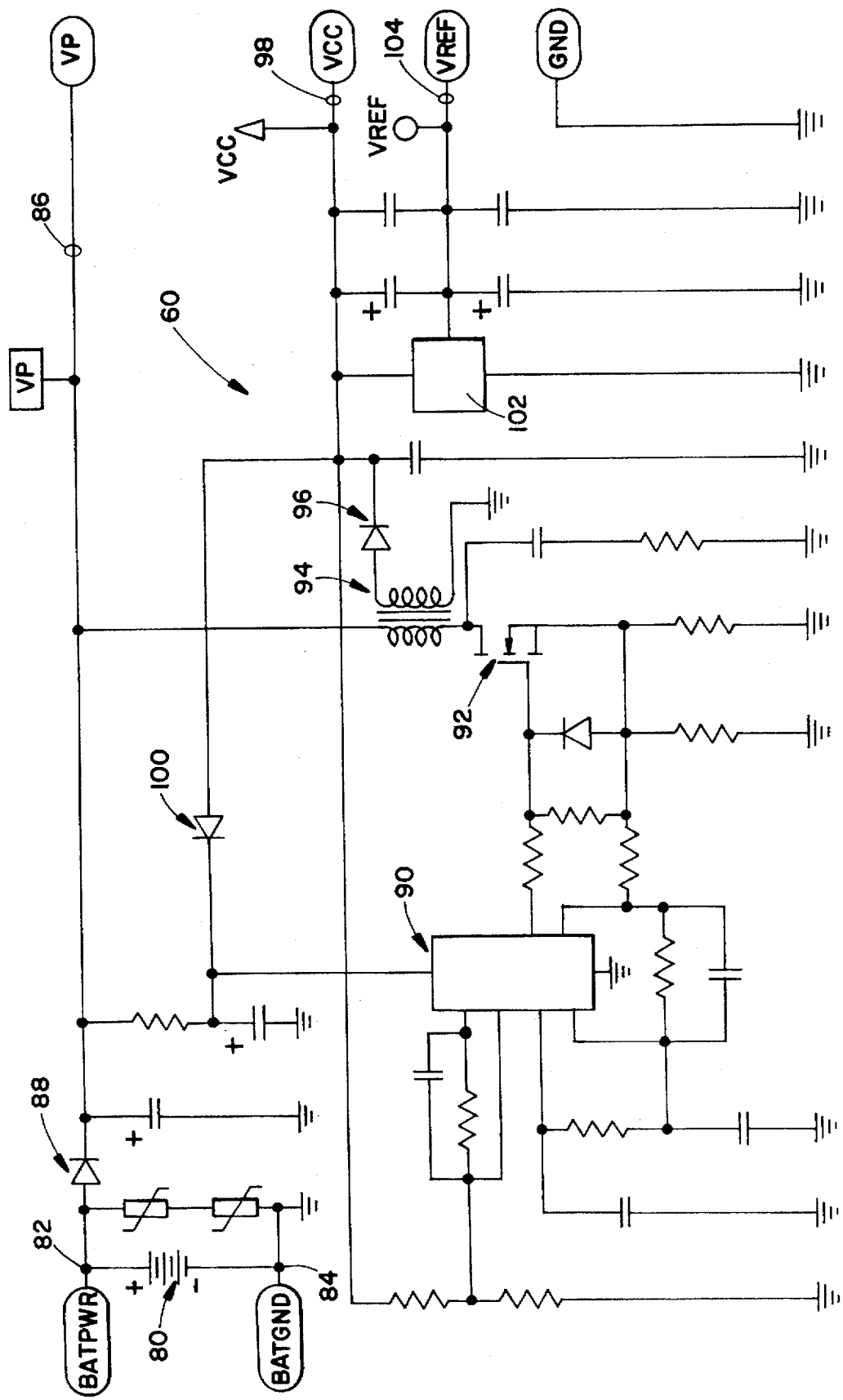
FIG. 3 is a detailed electronic diagram of the power supply circuit used in the servo control system illustrated in FIG. 1.

The power supply circuit 60 is illustrated in detail in FIG. 3. It receives raw or unregulated DC input voltage or power from an external source illustrated in the figure as a battery 80. The battery 80 is connected to the power supply circuit 60 through a first pair of battery leads 82, 84. Passing essentially straight through the power supply circuit 60 is an unregulated battery signal VP which appears on the battery voltage signal line 86. The signal VP represents the voltage level received from the battery 80 less a small voltage drop across a blocking diode 88. As will be described in greater detail below, the battery voltage signal VP is used by each of the various circuits comprising the servo control apparatus C as an indication of the voltage level of the battery 80 connected to the power supply circuit 60 through leads 82, 84.

In the preferred embodiment, the nominal battery voltage level is 12 volts (12V). The battery is preferably of the type used in automobiles, trucks and most farm equipment and the descriptions regarding specific signal levels below will follow accordingly. Of course, a "12 volt" system actually operates near 13.8 volts in order to provide battery recharging while the vehicle is in use. However, it is to be appreciated that other voltage levels may be employed such as 18 or 24 volts (20.7V or 27.6V) for example, which may be popular in foreign countries or otherwise useful in special applications.

Power supplies of the type illustrated in FIG. 3 are commonly referred to as "current mode pulse width modulation regulators" by those skilled in the art. The power supply circuit 60 includes a number of integrated circuits ICs, a miniature transformer and solid state devices to save costs and to conserve power wherever possible. One integrated circuit advantageously used is the FET driver 90 available from UNITRODE as part number UCC3000. This device drives the gate of a power field effect transistor 92 which in turn switches current flow through the primary windings of a switching transformer 94. The secondary side of transformer 94 is tied on one end to the battery ground GND and on the other end to a rectifying diode 96. The rectifying diode 96 is oriented to permit current to flow from the secondary side of the transformer 94 in one direction only to establish a power supply voltage signal VCC on a power supply voltage signal line 98.

The secondary side of the transformer 94 is also connected back to the power input of the FET driver 90 through a second diode 100. The second diode 100 is provided to ensure that the power supply voltage signal VCC will be maintained during momentary drops in the unregulated battery voltage signal VP to abnormally low levels.

A voltage divider 102 is used in the power supply circuit 60 to generate a signal used by the servo control apparatus as a virtual ground. Preferably, the voltage divider is an integrated circuit available from Texas Instruments as part number TLE2426. The voltage divider 102 receives an input from the power supply voltage signal VCC and generates a reference voltage signal VREF on a reference voltage signal line 104 which mirrors the input voltage signal level by one half i.e. ½ VCC. Apparatus used in this manner to produce a second signal having half the intensity of a first signal are commonly referred to in this context as "rail splitters" by those skilled in the art. Reference voltage signal VREF is thus derived from power supply voltage signal VCC and is given by VREF=0.5*VCC±1%. In the preferred embodiment, the nominal voltage levels for VP, VCC and VREF are battery (12V), 12.1V and 6.05V respectively, all with respect to ground GND.

SERVO AMPLIFIER CIRCUIT

Figure 4:
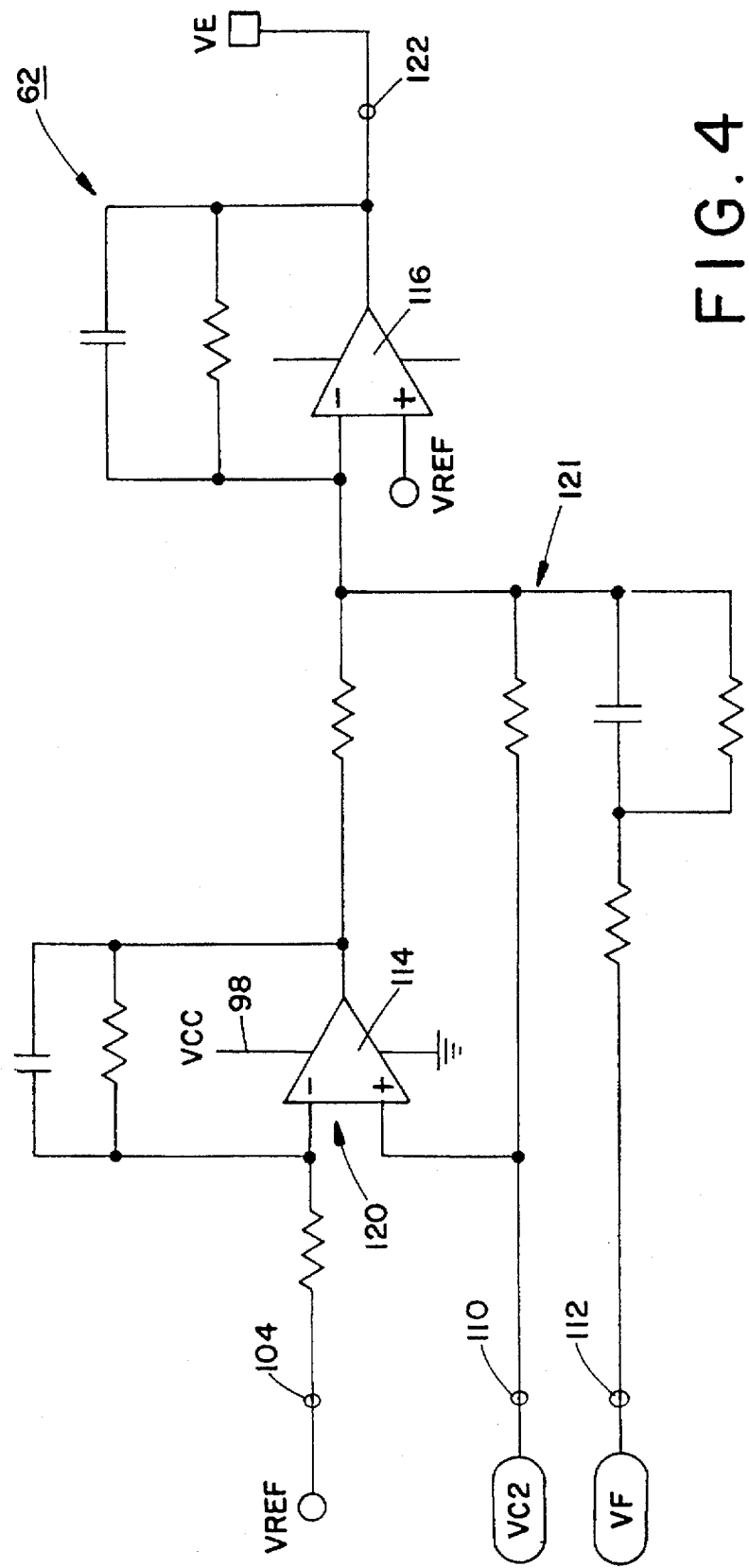
FIG. 4 is a detailed electronic diagram of the servo amplifier circuit used in the servo control system illustrated in FIG. 1.

With reference now to FIGS. 1 and 4, the servo amplifier circuit 62 includes a pair of analog signal input nodes 110, 112 adapted to receive a variable command signal VC2 and a feedback signal VF respectively. The command signal is received into the servo amplifier circuit 62 from any number of operatively associated external electronic device types such as automatic electromechanical steering mechanisms, foot pedals or the like. In actual practice of the steering system B, a command signal is typically generated by an optical encoder (not shown) connected to the steering shaft 12. The magnitude of that command signal is proportional to the rate of rotation of the steering wheel W. In the preferred application of the present invention illustrated in FIG. 1, however, the command signal VC2 will be discussed as originating solely from a joystick J. The feedback signal VF is received into the servo amplifier circuit 62 from the inductive position sense circuit 68 where it is generated in a manner described in greater detail below. In real-world application, an electronic lock-out circuit (not shown) prevents conflict between the joystick J input and the optical encoder input signal.

The command signal VC2 is a voltage signal observed with respect to a "virtual ground" or more particularly to the reference voltage signal VREF sourced from the power supply circuit 60. Thus, in the preferred embodiment, the command signal is a direct current D.C. voltage referenced to 6.05V and is representative of a desired armature position in the motor B. This being the case, the joystick J or other external control devices preferably generate signals ranging from no less than −6.05V to no more than +6.05V with respect to VREF (104).

In the first extreme, with the command signal VC2 at −6.05V, the net nominal effect or difference at the servo amplifier circuit 62 is zero volts 0V, within the range of the power supply circuit 60. Conversely, in the other extreme with the command signal VC2 at +6.05V, the net effect at the servo amplifier circuit 62 is slightly over twelve volts +12.1V, also within the range of the power supply circuit 60. However, given the inherent built-in signal amplification in the servo amplifier circuit 62 by the first OP amp 114, the preferred maximum swing in the command signal level is 1.5V centered about the null or zero command voltage level of 6.05V (VREF) which is also the virtual ground level. Accordingly, the behavior of the command signal VC2 is expected to remain within the range from +7.55V to 4.55V with respect to the battery ground GND. Each of the OP amps 114 and 116 successively affect the input signal differential between the command and feedback signals VC2 and VF. The first amplifier includes an extremely high gain (e.g. 66×) which magnifies the difference between the virtual ground VREF and the command signal VC2. The high gain causes saturation of amplifier 114 for small initial change of VC2 and effectively works to quickly shift the sleeve 20 to a position where fluid begins to flow in the fluid controller or valve 14. This operation masks a "dead band" in the valve which typically accounts for 25% of the valve/sleeve travel. Beyond the saturation of the first OP amp 114, further command change from the joystick is additive at the input of the second OP amp 116. The second amplifier 116 performs the error amplification between the command signal VC2 and the feedback signal VF. This amplified difference is used by the PWM generator circuit in a manner described below.

As indicated above, the servo amplifier circuit 62 receives the command signal VC2 on a first input node 110 and the virtual ground signal VREF from the power supply circuit. These signals are routed to a first summing circuit 120 at the OP amp 114. The first summing circuit effectively amplifies the difference between the command signal VC2 on the first input node 110 and the virtual ground signal VREF on its corresponding input node 104. A second summing circuit 121 is formed between the first and second OP amps 114, 116. The second summing circuit combines the output of the first OP amp with the command and feedback signals. The overall combination is an error signal which is applied to the inverting input of the second OP amp 116. Of course, the feedback signal VF represents the actual position of the armature 30 observed and generated by the inductive position sense circuit 68 in a manner which will be described in greater detail below.

The difference signal generated by the second summing circuit 121 is integrated by the second OP amp 116. This integrated result or amplified and integrated error signal VE is outputted from the servo amplifier circuit 62 on an output node 122.

To determine the voltage levels in the circuit 62, a current summation calculation at node 121 is performed as understood by those skilled in the art. As an example of the above using the circuit values and ranges of the preferred embodiment, if the command signal VC2 is 1.5V with respect to VREF, the feedback signal VF will be about −4.55V with respect to VREF. The error signal therebetween is then amplified by a magnitude limited only by the internal gain of the OP amp 116 to generate the amplifier error signal VE on the output node 122. This signal is then used to shift the duty cycle of the pulse width modulation PWM generator circuit 64 to effect armature position control correction in the motor A. More particularly, the error signal induces an offset duty cycle having a net average D.C. component in one direction within the PWM generator circuit. The H-bridge circuit 66 is responsive thereto, to move the armature more toward the desired command position represented by the 1.5V command signal VC2. When the armature moves to the desired position, the feedback signal VF offsets the command signal VC2 resulting in an absence of an error signal VE. When the feedback signal offsets the error signal, the duty cycle becomes balanced to command the armature to remain stationary.

PULSE WIDTH MODULATION PWM GENERATOR CIRCUIT

Figure 5:
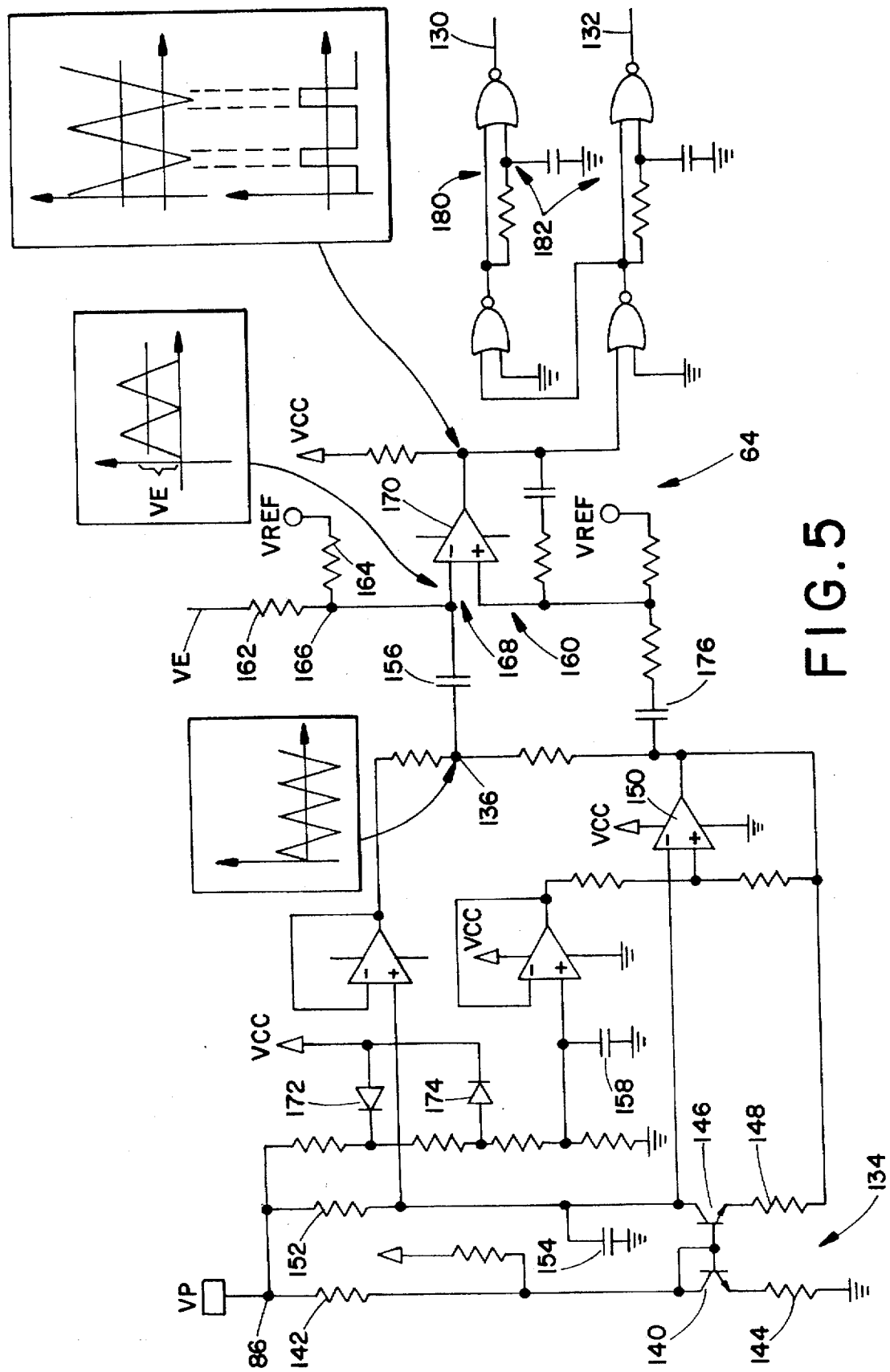
FIG. 5 is a detailed electronic diagram of the pulse width modulation generator circuit used in the servo control system illustrated in FIG. 1.

With reference to FIGS. 1 and 5 but with particular reference to FIG. 5, the pulse width modulation generator circuit 64 is illustrated in detail. That circuit receives inputs from five sources in order to generate a pair of complimentary PWM output signals 130, 132. The five inputs include the battery voltage signal VP, the power supply voltage signal VCC, the ground signal GND, the error signal VE and the virtual ground reference voltage signal VREF. In typical modern servo fashion, the error signal VE from the servo amplifier circuit 62 is used to adjust the duty cycle of the PWM signals 130, 132 for effecting the downstream operation of power semiconductor switches for applying pulsed battery power to a motor. In the preferred embodiment, the PWM signals 130, 132 are applied to the H-bridge and inductive position sense circuits 66 and 68 respectively. The battery voltage signal VP is used by the pulse width modulation generator circuit 64 in a novel manner to further adjust or otherwise "fine tune" the duty cycle in order to compensate for a wide range of anticipated battery sizes or levels i.e. 12V–24V, used by the servo control apparatus C.

In order to command the correct average output voltage signal at the H-bridge circuit using the PWM output signals 130, 132, the duty cycle at the driver power FETs (discussed below) must be decreased for larger battery voltage signals VP and increased for smaller battery voltage signals. Since the windings of the motor A are connected directly to the battery 80 through the driver FETs, the duty cycle must be controlled to effect a consistent average D.C. output signal at the motor based solely on the error signal, regardless of battery VP level. Generally, a long duty cycle for a small battery voltage signal has an equivalent average voltage at the motor as a shorter duty cycle for a large battery voltage signal. As an example, for a first error signal VE, the duty cycle should be reduced by 50% from that used for a battery voltage signal VP which is twice as large. A 50% duty cycle for a 24V battery 80 is equivalent to a 100% duty cycle with a 12V battery. The oscillation frequency of the pulse width modulation generator circuit 64 remains a constant (18 kHz) in the preferred embodiment.

A specialized front end circuit 134 is used by the pulse width modulation generator circuit 64 to generate a triangular voltage signal at node 136, the amplitude of which is representative of the battery voltage signal VP. Overall, however, the circuit 134 is commonly referred to as a "current mirror" circuit by those skilled in the art. The triangular wave signal level is used to modify the duty cycle to accommodate a range of battery characteristics. The amplitude of the triangular wave increases with increasing battery voltage VP levels.

A first transistor 140 in the front end circuit 134 has its base electrically connected to its collector forming in effect, a diode. The first leg of the current mirror comprises a simple voltage divider circuit including a first resistor 142 connected in series to the first transistor 140 wired as a diode and lastly to a second resistor 144. The voltage divider circuit dictates the current flowing in the first leg of the front end circuit 134 based in part on the level of the battery voltage signal VP.

The second leg of the voltage divider circuit includes a second transistor 146 and a third resistor 148. A charging and discharging action on capacitor 158 causes comparator 150 in the pulse width modulation generator circuit 64 to periodically pull its output to ground. When the output of the comparator 150 is at a low level, the current flowing through the second and third resistors 144, 148 will be equal to each other or, more precisely, the respective currents therethrough will "mirror" each other.

The mirror current flowing through the third resistor 148 is essentially the current flowing into the collector of the second transistor 146. This current comes from one or both of a fourth resistor 152 and a capacitor 154. The fourth resistor 152 is selected to have a resistance value of about twice that of the first resistor 142. Thus, when the comparator 150 is in a low logic output level, about one half of the current through the second transistor 146 flows through the fourth resistor 152 and the other half from the discharging capacitor 154. Conversely, when the comparator 150 is a high logic output level, the capacitor 154 is charged due to the non-conductive state of the second transistor 146 and the current through the fourth resistor 152.

By doubling the battery voltage VP, the amount of charge per unit time placed on and retrieved from the capacitor 154 doubles, approximately. That is, the triangular voltage signal at node 136 will have a higher amplitude for larger battery voltage. Equivalently, the absolute maximum and minimums of the triangular wave are larger for larger battery voltages VP. The amplitude of the triangular wave doubles for each doubling of the battery voltage VP. As indicated above, the triangular frequency remains fairly constant but for transient conditions such as at power-up. The voltage signal at node 136 is capacitively coupled to the comparator stage 160 of the pulse width modulation generator circuit 64 via a D.C. blocking coupling capacitor 156.

A voltage divider circuit is formed to split the servo error signal VE and reference voltage signal VREF between a fifth and sixth resistor 162, 164. This divided voltage signal at node 166 adds a DC component to the voltage signal 136 in effect "shifting" the triangular signal up or down with respect to the virtual ground reference voltage signal VREF. The DC voltage present at node 166 sets the threshold against which the triangular voltage signal 136, shifted by the D.C. signal at node 166, induces a logic level inversion downstream. Generally, the amount of the "triangle" which lies above and below the threshold level, more particularly the crossover point VREF, determines the duty cycle within the H-bridge circuit 66.

Thus, effects of the battery voltage VP are cancelled out and only the error signal VE controls the position of the armature 30. The battery voltage VP affects the amplitude of the triangular voltage signal 136 while the error signal VE adjusts the thresholding level through the reference voltage VREF. Overall, the system is immune to the level of the battery voltage VP. Generally, the effect of a nominal D.C. voltage signal offsetting a large triangular wave results in a smaller duty cycle change than the same nominal D.C. voltage signal offsetting a smaller amplitude triangular wave. The slopes of the larger triangular wave begins to resemble a vertical rise or fall at the extreme case whereat D.C. offsets have little effect. The slopes of the larger triangular wave nullify somewhat therefore, the level shifting by the D.C. offset.

The comparator 170 switches output logic level whenever there is a change in sign at the input node 168 thereof. Accordingly, when the error signal VE is positive with respect to the reference voltage signal VREF, a larger part of the shifted triangular wave at node 166 is above the threshold level. Therefore, the output of the comparator 170 will be low (inverted) for a larger part of the duty cycle. Conversely, when the error signal VE is negative with respect to the reference voltage signal VREF, a smaller part of the shifted triangular wave at node 166 is above the threshold.

But for the specialized front end circuit 134, the pulse width modulation generator circuit 64 is basically a simple relaxation oscillator circuit found commonly in the art. However, the novel provision of the extra measure of battery level compensation permits flexible use of the present invention in a wide variety of applications using various battery voltages without modification of hardware.

The pulse width modulation generator circuit 64 further includes a built-in protection circuit comprising a pair of diodes 172, 174 which prevent an over-voltage condition. An additional capacitive coupling to the comparator 170 through capacitor 176 forces oscillation in the circuit during transient conditions, such as at power up. In the preferred embodiment illustrated, the pulse width modulation generator circuit 64 oscillates at 40 KHz. During transient conditions, the oscillation frequency may fall to 30 KHz.

Lastly, the pulse width modulation generator circuit 64 includes a logic stage 180 whereby a pair of complementary PWM signals 130, 132 are first conditioned and then buffered before use by the H-bridge and inductive position sense circuits 66 and 68. The logic stage 180 includes a pair of RC networks 182 each having predetermined time constants. These space apart the timings of the logical transitions between the PWM signals 130, 132 primarily to prevent "shoot through" in the H-bridge circuit 66.

THE H-BRIDGE DRIVE CIRCUIT

Figure 6:
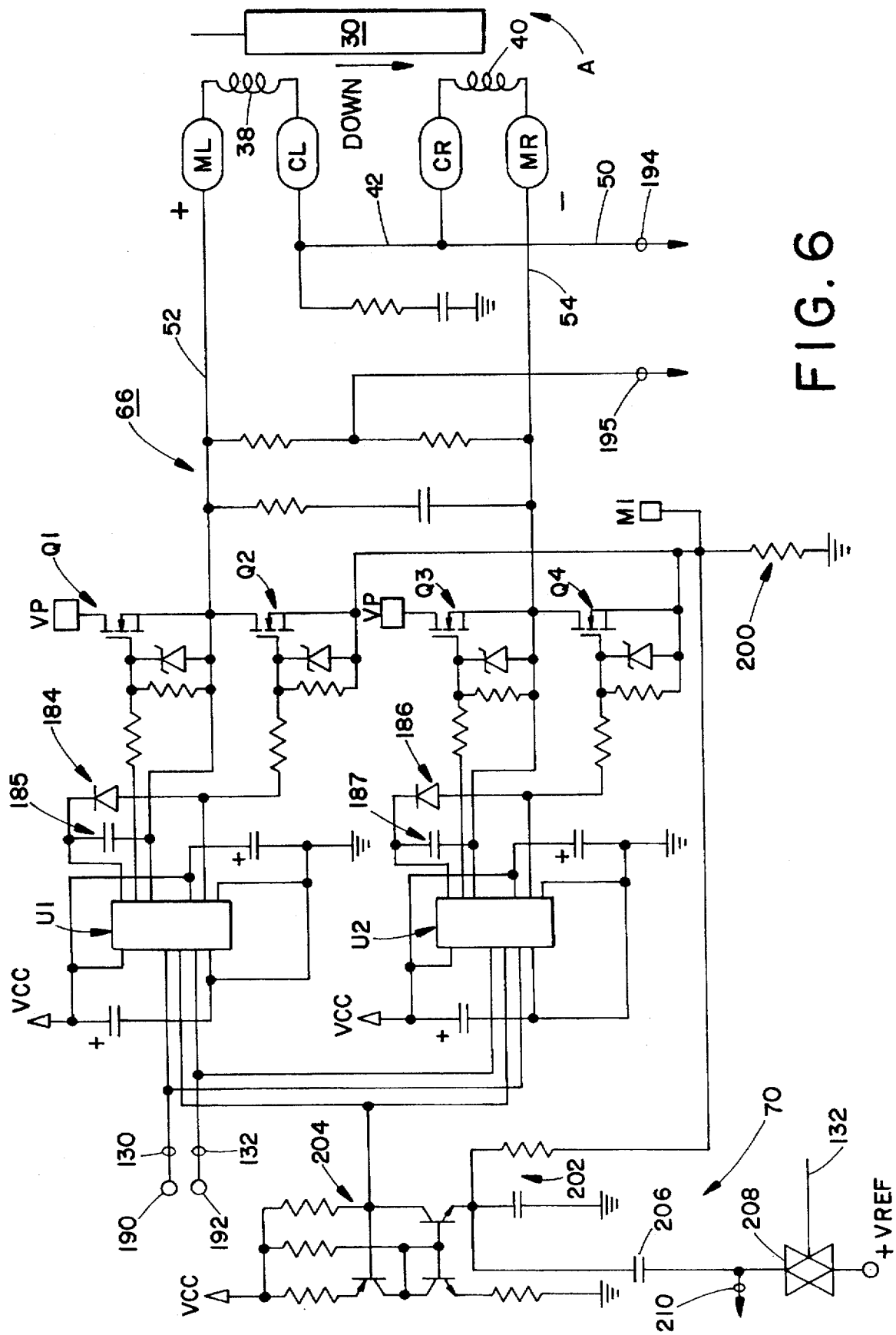
FIG. 6 is a detailed electronic diagram of the H-bridge drive circuit used in the servo control system illustrated in FIG. 1; and, FIG. 7 is a detailed electronic diagram of the inductive position sense circuit used in the servo control system illustrated in FIG. 1.

With reference next to FIG. 6, the H-bridge drive circuit 66 receives the pair of complimentary PWM signals 130, 132 from the PWM generator circuit 64 on nodes 190, 192. These signals are used to coordinate the switching of a paired set of complementary power drive FETs Q1–Q4 through an intermediary pair of integrated circuit logic chips U1 and U2.

Topologically, the first and second power drive FETs Q1, Q2 form the first side of the "H" while the third and fourth power drive FETs Q3, Q4 form the second side or leg of the "H" configuration. The linear electric motor A is electrically disposed between the "legs" of the H such that one end of the first coil 38 is connected between the first and second FETs Q1, Q2 via lead wire 52, while the other end of the second coil 40 is connected between the third and fourth FETs Q3, Q4 via lead wire 54. As indicated earlier, the coils 38, 40 of the motor pair are series-connected providing a common tap 42 which is used to communicate a differential signal 194 to the inductive position sense circuit 68 on lead wire 50.

The integrated circuit logic chips U1, U2 are commonly referred to as "low and high side drivers" by those skilled in the art. In the preferred embodiment, International Rectifier devices are used and are available as part no. IR2110.

As illustrated, the logic chips U1, U2 are each arranged to receive the pair of complimentary PWM signals 130, 132 from nodes 190, 192. Respective ones of power drive FETs Q1–Q4 are gated under the control of chips U1, U2 based on the logical state of the signals 130, 132. Generally, when Q1 is ON, Q2 and Q3 are OFF and Q4 is ON. Motor drive current flows in that operating mode through the coil pair series 38, 40 in the direction illustrated in the drawing as DOWN. When Q2 is ON, Q1 and Q4 are OFF and Q3 is ON. Motor drive current in this operating mode flows through the coil pair series 38, 40 in the up direction i.e. from MR to ML.

When power drive FETs Q1 and Q4 are gated ON for a longer period of time than the power drive FETs Q3 and Q2, the net voltage across the drive coil pair 38, 40 in the electric motor A will be as illustrated in FIG. 6. That is, a net voltage potential indicated by the "+" and "−" symbols will occur across the coil inductances from the lead wire 52 to the lead wire 54. This average voltage imbalance due to the biased duty cycle determines the direction of average current flow through the drive coil pair 38, 40. The instantaneous current waveforms through the coil pair are triangular. For a duty cycle with no net or D.C. average bias, power drive FETs Q1 and Q4 are gated on for an amount of time matching that which FETs Q2 and Q3 are gated on, resulting in a triangular current waveform through coild 38, 40 with a zero DC average. The actual current level is based on volt-seconds and therefore depends on at least the frequency of oscillation, the inductance of the drive coils 38, 40 and the battery voltage VP.

A pair of diodes 184, 186 are used in combination with the power drive FETs Q1, Q2 and Q3, Q4 respectively. In certain abnormal situations it is possible for either Q1 or Q3 to enter into an undesirable state of partial conduction. In this state, insufficient gate voltage prevents the power FETs from full conduction but rather causes Q1 or Q3 to merely become resistive. Of course, this condition can cause irreversible damage to the FETs due to the heat generated therein. The diodes 184, 186 prevent this situation by selectively charging a pair of capacitors 185, 187 respectively.

Prior H-bridge circuits have traditionally connected the cathode of diode 184 to the integrated circuit U1 as shown, but have connected the anode of the diode to the power supply pin of the circuit U1. In this configuration, when Q2 is conducting or "ON", the capacitor 185 is charged by current flowing through the forward biased diode 184. When Q1 is to be turned ON and Q2 OFF, the charge on capacitor 185 is used to furnish the necessary gate voltage to cause Q1 to conduct. The components of the lower portions of the circuit illustrated function in a corresponding fashion. Under normal operating conditions, the charge on the capacitor is sufficient. However, over time, the charge almost completely drains off when the oscillator in the PWM circuit stops oscillating for unforeseen or unexpected reasons. A small amount of parasitic charge remaining on the gate prevents the FET Q1 from turning OFF completely inducing partial conduction which can lead to possible overheating problems.

As illustrated in the FIGURE showing the preferred H-bridge circuit, however, the anode of the diodes 184, 186 are each respectively connected to the gate inputs of the "lower" FETs Q2 and Q4.

In operation, when Q2 is ON, the capacitor is charged to the power supply voltage VCC through the diode 184 and through the connection of the gate of Q2 to VCC via the integrated circuit U1. When power FET Q2 is switched OFF and Q1 is switched ON, the charge stored on the capacitor 185 is used to drive the gate of Q1 through the integrated circuit U1. If the basic oscillator stops with Q1 being commanded ON, the charge on capacitor 185 discharges to zero volts (0V) in a short enough time period that Q1 does not remain in a partially conducting highly dissipative state for any appreciable length to cause overheat damage. The first power FET Q1 is thereby directly driven into conduction without becoming trapped in the aforementioned undesirable state of partial conduction. Since the H-bridge circuit is substantially symmetrical, the operation of the diode 186 and capacitor 187 mirrors the operation of diode 184 and capacitor 185 described above.

In the preferred application of the present invention, a centering spring (not shown) holds the armature 30 centered longitudinally between the pair of drive coils 38, 40. In practice, the spring can be placed in the motor A, the steering unit B, or in the linkage 22–28 connecting the motor and steering unit. In any case, when the armature is centered longitudinally, the inductance of the first drive coil 38 essentially matches that of the second drive coil 40 since the armature reacts magnetically with each coil in equal amounts. With a non-biased or 50% duty cycle gating the power drive FET pairs equally on average, the net differential voltage feedback signal 194 observed at the common tap 42 with respect to VREF will be nil. A supplemental reference signal 195 is derived through a pair of resistors connected in series between the lead wires 52 and 54. This signal is used to determine abnormal operating conditions in the circuit.

By moving the armature 30 longitudinally upwardly as viewed in the FIGURE, the inductance of the first drive coil 38 increases while the inductance of the second drive coil 40 decreases. The differential voltage signal 194 observed at the common tap 42 will no longer be balanced but rather will carry an AC voltage. The phase of this AC voltage is 180° with respect to the voltage across the coil inductances from lead wire 52 to lead wire 54 and is indicative of the direction of the armature with respect to the center position (in the figure, either UP or DOWN). The magnitude of the AC voltage signal is indicative of the distance of the armature from the center position.

As an example of the above description and with continued reference to FIG. 6, when the armature 30 is centered between coils 38 and 40, the voltage signal 194 with respect to ground GND is a DC voltage about one-half the battery voltage VP with negligible AC voltage superimposed on it.

When the armature 30 is below center position as viewed in the FIGURE, the phase of the AC component of signal 194 matches that of the signal between leads 52 and 54. The magnitude of this AC component is proportional to the distance that the armature is from the magnetic center position between the coils 38 and 40.

Lastly, when the armature 30 is above center position as viewed in the FIGURE, the AC component of signal 194 is 180° out of phase with the signal between leads 52 and 54. The magnitude of course is proportional to the distance from the magnetic center between coils 38 and 40.

The voltage signal 194 at the common tap is of course a result of the pulse width modulation driving signals. As such, it is necessary to demodulate the voltage signal in synchronism with the signals applied by the PWM generator circuit. In the preferred embodiment, this is performed by the inductive position sense circuit 68 described below. However, it is logical to first discuss the current sense circuit 70 of the H-bridge circuit since an average current signal is generated there to be used subsequently by the inductive position sense circuit 68 as a necessary input signal.

The current sense feedback circuit 70 of the preferred embodiment is used primarily to generate an offset signal to compensate for the effects of current flow in the motor A. With continued reference to FIG. 6, a current shunt resistor 200 is illustrated connected to each of the legs of the H-bridge. More particularly, the shunt resistor connects each of the source leads of power FETs Q2 and Q4 to ground. Since these FETs Q2 and Q4 are never gated ON simultaneously, the signal on the shunt resistor 200 changes at the PWM rate and represents the magnitude and direction of current flow through the coils 38, 40 of the linear electric motor A. Thus, an A.C. voltage signal is generated across the shunt resistor 200, the voltage level being representative of the current flow through the power FETs and through the coils 38, 40 of the motor. When the average current through the motor is reversed commanding the motor to move in the opposite direction, that reversal command is reflected by a change in phase of the A.C. voltage signal across the shunt resistor 200.

A filter 202 modifies the voltage signal across the shunt resistor to remove noise and any spurious voltage spikes or the like. The filter 202 generates a current sense feedback signal 210 which is used by the inductive position sense circuit in a manner to be described below. Lastly, in connection with the current sense feedback circuit 70, a current limit circuit 204 is provided in order to ensure that the current through the FETs Q1-Q4 is never excessive. The feedback signal is stored on a capacitor 206 as a voltage level with respect to the virtual common reference VREF through the action of transmission gate 208 which is switched ON whenever Q2 and Q3 are ON. The transmission gates 208 and 209 (FIG. 7) synchronously demodulate the signal from the shunt resistor 200. The transmission gate 208 in the H-bridge circuit 66 is gated into conduction while FETs Q2 and Q3 are ON. The transmission gate 209 (FIG. 7) is gated into conduction only while FETs Q1 and Q4 are ON. After the signal is synchronously demodulated, it is stored on a capacitor 213 in the position sense circuit 68 to be described below.

Generally, the current sense output signal 210 generated in the current sense circuit 70 indicates the net current flow through the coils 38, 40 of the linear electric motor A. As indicated above, the signal is demodulated by transmission gates 208 and 209. The net current flow in turn represents the commanded direction in the motor. If the net current flow is in the direction marked DOWN (FIG. 6), then the demodulated current sense output signal results in a positive DC voltage signal which appears on capacitor 213. Conversely, if the net current flow is in the up direction (MR to ML), then the demodulated current sense output signal is a negative DC voltage signal on capacitor 213. The DC voltage level of the current sense output signal is used in the inductive position sense circuit 68 for compensation in a manner to be discussed below.

The current sense circuit 70 thus performs three (3) basic functions. First, the circuit performs a doubling of the peak voltage signal on the current shunt resistor 200 to obtain a current sense output signal 210. Second, the current sense circuit 70 synchronously demodulates the voltage signal on the resistor 200 in conjunction with transmission gate 209 to obtain a DC voltage signal on capacitor 213. Lastly, the circuit changes the reference point of the signals derived from the power FETs from ground GND to the control circuit reference voltage signal VREF.

THE INDUCTIVE POSITION SENSE CIRCUIT

Figure 7:
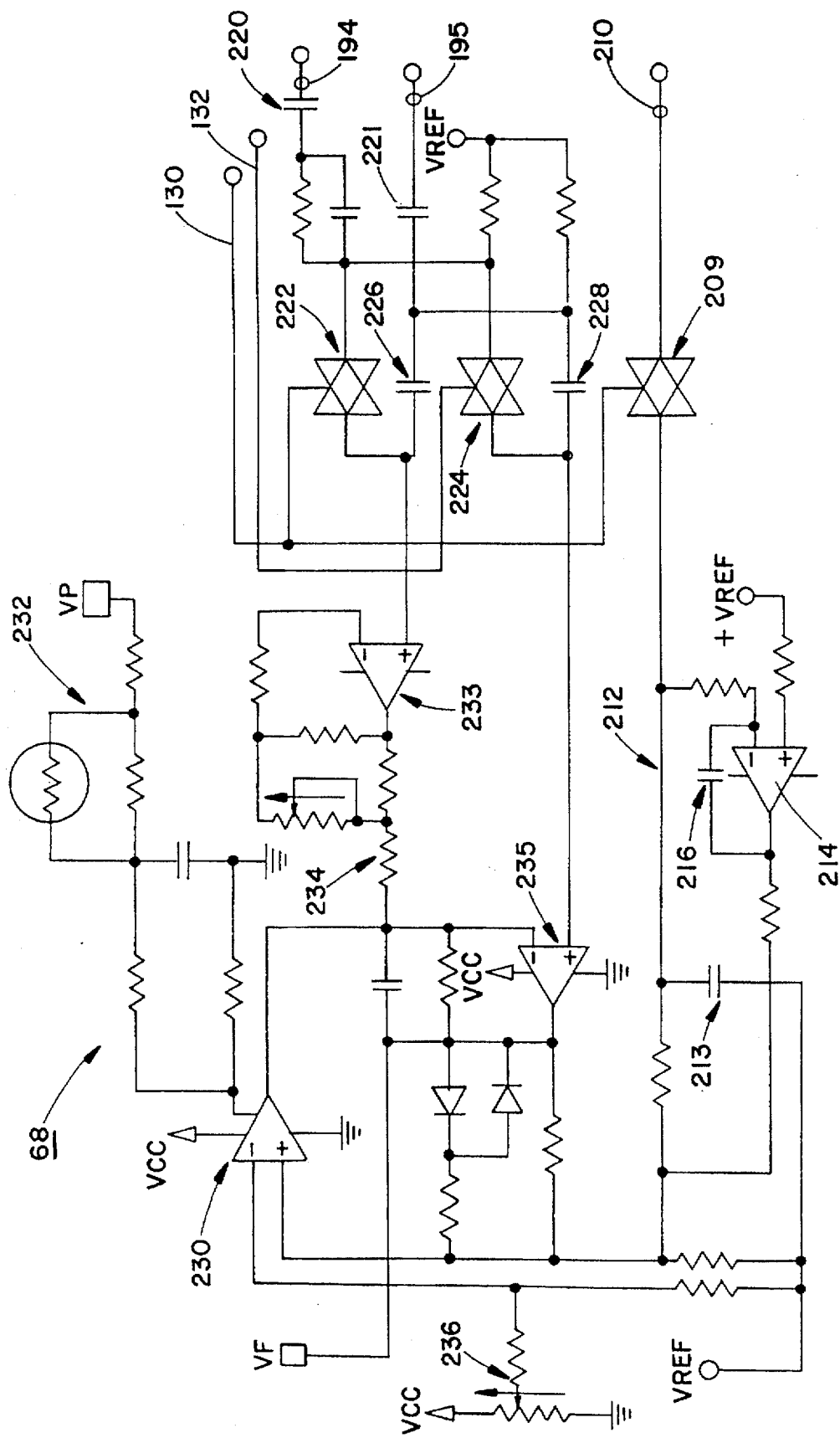

With reference now to FIG. 7, the inductive position sense circuit 68 will be described.

The first operation performed within the inductive position sense circuit is to synchronously demodulate the differential voltage feedback signal 194 which was generated by the H-bridge circuit 66 in a manner described above. Because the differential voltage signal is a square wave voltage signal which "floats" between the coils 38, 40 of the motor at the PWM frequency, a coupling capacitor 220 is used to reference that signal to the reference voltage signal VREF. A second coupling capacitor 221 is used to reference the supplemental reference signal 195 to the reference voltage signal VREF.

Similar to the transmission gate used in the current sense circuit 70, a pair of transmission gates 222, 224 are used to perform a solid state relay function based on control signals comprising the complimentary PWM signals 130, 132 generated by the PWM generator circuit 64. The operation of the gates 222, 224 includes the use of a respective pair of storage capacitors 226, 228 for sampling and holding voltage signals at the inputs of their respective gates, in this instance, the voltage signal 194.

When the motor armature 30 is longitudinally positioned upward as viewed in FIG. 6, the first storage capacitor 226 is charged with a voltage level slightly less than the reference voltage signal VREF, while the second storage capacitor 228 is charged with a voltage level slightly more than the reference voltage signal VREF. This DC differential voltage is indicative of armature position. Conversely, when the motor armature 30 is longitudinally positioned downward as viewed in FIG. 6, the first storage capacitor 226 is charged with a voltage level slightly more than the reference voltage signal VREF while the second storage capacitor 228 is charged with a voltage level slightly less than the reference voltage signal VREF. Again, the DC voltage differential observed between the charge on respective capacitors 226, 228 is indicative of armature position and battery voltage.

An operational transconductance amplifier 230 is advantageously used in the inductive position sense circuit 68 as follows. An internal current is established within the amplifier 230 based on the battery voltage signal VP and a resistance circuit 232. The current through the amplifier 230 is a function of a product of the differential voltage at its input nodes and the internal current from the resistance circuit 232. This current, whether sourced or sunk is used to establish a voltage across the resistance circuit 234 which is proportional to the voltage potential between the first and second storage capacitors 226, 228. The operational transconductance amplifier 230 is thus used to compensate the feedback signal VF for the effects of a variable battery voltage VP. Since the current in the resistance circuit 232 is a function of battery voltage, the output signal from the amplifier 230 reflects the battery voltage level. The signal from a first OP amp 233 is proportional to the battery voltage. The component of that signal due to the battery voltage is effectively cancelled by the output level assumed by the transconductance amplifier 230. Thus, the feedback output VF of the second amplifier 235 includes no battery voltage component and is therefore immune to the battery level.

A variable potentiometer 236 is used to calibrate the inductive position sense circuit 68 for a standard center armature position. With the armature 30 longitudinally centered between drive coils 38, 40, the variable potentiometer 236 is adjusted until the feedback signal VF is at a minimum level.

Further, when the armature 30 is centered between the coils 38, 40, an integrator circuit 212 including an OP amp 214 and a capacitor 216 is used to correct for hysteresis in the motor A. The hysteresis caused by residual flux in the motor coils and armature evidences itself as a small false offset voltage presented on the shunt resistor 200 (FIG. 6). The offset voltage thus affects the current feedback signal 195.

The motor, as described above, includes a mechanical centering spring which is used to urge the armature to a center position between the coils when there is no motion/ position command signal present. However, it is rare that the spring precisely centers the armature exactly, but rather, only approximates the center position within a predetermined tolerance. This being the case, the servo control apparatus C constantly attempts to position the armature at the electromagnetic center between the coils. With the armature within the predetermined tolerance, the position error signal is small and therefore the control apparatus outputs only a small offsetting command signal which may be insufficient to overcome the spring force. The integrator circuit 212 offsets the feedback signal to mask the effects of the slight difference between the electro-magnetic and actual mechanical zero positions. As can be seen from the FIGURE, the integrator circuit 212 also affects the motor output signal when the armature is commanded to move. More particularly, the output of the OP amp 214 subtracts a small amount from the gross feedback signal at all times, including during periods of joystick operation. The small amount of loss in the feedback signal has negligible effect when the armature is moved significantly from the center position because of the relative proportions of the OP amp 214 signal and the current feedback signal 195. Those signals dwarf the signal from the OP amp 214. Also, the integrator circuit saturates at an output value particularly selected to noticeably affect only conditions when the armature is very close to the center position.

The current sense output signal 210 is grafted into the network feeding the amplifier 230 in order to cancel the effects of current flowing through the linear electric motor A. It has been observed that the feedback signal VF is unduly influenced by the applied PWM drive waveforms. This phenomena is noticeable before the longitudinal position of the armature has had time to vary or otherwise react to the applied motion command signal. Accordingly, the current sense circuit 70 generates the signal 210 which is indicative of the applied current to the linear motor in a manner described above to be used within the inductive position sense circuit to cancel these ill effects or "phantom" signals. The current sense output signal 210 is essentially subtracted from the feedback signal VF in order to provide the servo amplifier circuit 62 with a compensated feedback signal which accurately represents the longitudinal armature position. The feedback signal VF is outputted from the inductive position sense circuit 70 at a level suitable for use by the servo amplifier circuit 62 in the manner described above, thus closing the control loop.

The invention has been described with reference to the preferred embodiment. Modification and alterations will occur to others upon reading and understanding of this specification. It is my intention to include all such modifications and all alterations insofar as they come within the scope of the appended claims or equivalents thereof.

Having thus described the invention, I now claim:

1. A method of developing a position feedback signal in a linear actuator including a pair of coils series connected at a node and disposed on an armature or stator of the linear actuator, each of the pair of coils being magnetically influenced by a magnetic field generating member disposed on the other of the armature or stator for causing relative movement between the armature and the stator, the magnetic field generating member being powered by a modulated signal, the method comprising the steps of:

generating a first current flow through said pair of coils during a first portion of the modulated signal;

generating a second current flow through said pair of coils during a second portion of the modulated signal;

sensing a first voltage signal at said node during said first portion of the modulated signal;

sensing a second voltage signal at said node during said second portion of the modulated signal; and, combining said first voltage signal with said second voltage signal as said position feedback signal.

2. The method according to claim 1 wherein the step of combining the first voltage signal with the second voltage signal includes developing a differential voltage signal between said first and second voltage signals as said position feedback signal.

3. A method of developing a position feedback signal in a linear actuator including a pair of coils series connected at a node and disposed on an armature or stator of the linear actuator, each of the pair of coils being magnetically influenced by a magnetic field generating member disposed on the other of the armature or stator for causing relative movement between the armature and the stator, the method comprising the steps of:

generating a first current flow through said pair of coils for a first time period;

generating a second current flow through said pair of coils for a second time period;

sensing a first voltage signal at said node during said first time period;

sensing a second voltage signal at said node during said second time period; and, combining said first voltage signal with said second voltage signal as said position feedback signal, wherein the step of generating the second current flow includes generating said second current flow through said pair of coils for a time period non-overlapping said first time period.

4. The method according to claim 1 wherein the step of generating the second current flow includes generating said second current flow through said pair of coils in an opposite current direction than said first current flow through said pair of coils.

5. The method according to claim 1 wherein the step of combining said first and second voltage signals includes the step of combining said first and second voltage signals with an offset correction signal to develop said position feedback signal as a compensated position feedback signal, the offset correction signal being proportional to an average current flowing through said pair of coils over said first and second time periods.

6. The method according to claim 1 wherein the steps of generating the first current and generating the second current include applying a battery voltage signal directly to said pair of coils through a set of solid state switching devices responsive to switching control signals generated in a pulse width modulation circuit.

7. The method according to claim 6 wherein the step of applying said battery voltage signal includes adjusting said switching control signals generated by the pulse width modulation circuit to compensate for variations in said battery voltage signal.

8. The method according to claim 1 further comprising:
sensing said first current flow through said pair of coils as a third voltage signal;
sensing said second current flow through said pair of coils as a fourth voltage signal; and,
combining said third voltage signal with said fourth voltage signal to generate an offset correction signal representative of an average current flow through said linear actuator.

9. The method according to claim 8 wherein the step of combining said first and second voltage signals includes the step of combining said first and second voltage signals with said offset correction signal to develop said position feedback signal as a compensated position feedback signal.

10. In combination;
a linear actuator including;
an elongate substantially cylindrical core defining a longitudinal axis;
a cylindrical shell disposed around the core to define an annular space therebetween;
a first magnet of a first polarity mounted to the core in the annular space;
a second magnet of a second polarity mounted to the core in the annular space separated from the first magnet along the longitudinal axis; and,
a coil assembly disposed on an interior surface of the cylindrical shell, the coil assembly including a pair of coils series connected at a node, each of the pair being disposed on the interior wall in a spaced apart relationship along the longitudinal axis and each in operative magnetic communication with at least a one of the first and second magnets; and,
a control system including:
a drive circuit connected to the coil assembly and responsive to a command signal for generating a series of pulsed drive signals inducing a pulsed drive current to flow in the coil assembly thereby generating a pulsed magnetic field interacting with said first and second magnets; and,
a position sense circuit connected to said coil assembly for i) sensing a differential signal between said pair of coils at said node and ii) generating a position signal representative of the position of said core along said longitudinal axis based on said differential signal.

11. An apparatus for controlling the position of an armature relative to a stator according to a command signal in an operatively associated linear actuator of the type having a pair of series connected stator coils, the apparatus comprising:
a power supply for generating a controlled supply voltage;
a servo amplifier circuit connected to the controlled supply voltage, the servo amplifier circuit being responsive to an applied combination of the command signal from an operatively associated external source and a feedback signal to generate an error signal;
a pulse width modulation circuit connected to the controlled supply voltage and to the servo amplifier circuit for generating a pair of pulse width modulation signals responsive to said error signal;
a driver circuit, connected to the controlled supply voltage, the pulse width modulation circuit and to the pair of series connected stator coils of the operatively associated linear actuator, the driver circuit including solid state switching devices for gating a battery voltage from the power supply to the pair of series connected stator coils to cause relative motion between the armature and the stator; and,
an inductive position sense circuit connected to the controlled supply voltage, the pulse width modulation circuit and to the pair of series connected stator coils of the operatively associated linear actuator, the inductive position sense circuit being operative during said gating of said battery voltage from the power supply to synchronously demodulate a node voltage established at a node between said pair of coils and generate a differential voltage signal as said feedback signal.

12. The apparatus according to claim 11 wherein said pulse width modulation circuit includes first offset means to compensate the pulse width modulation signals for variations in said battery voltage.

13. An apparatus for controlling the position of an armature relative to a stator according to a command signal in an operatively associated linear actuator of the type having a pair of series connected stator coils, the apparatus comprising:
a power supply for generating a controlled supply voltage;
a servo amplifier circuit connected to the controlled supply voltage, the servo amplifier circuit being responsive to an applied combination of the command signal from an operatively associated external source and a feedback signal to generate an error signal;
a pulse width modulation circuit connected to the controlled supply voltage and to the servo amplifier circuit for generating a pair of pulse width modulation signals responsive to said error signal;
a driver circuit, connected to the controlled supply voltage, the pulse width modulation circuit and to the pair of series connected stator coils of the operatively associated linear actuator, the driver circuit including solid state switching devices for gating a battery voltage from the power supply to the pair of series connected stator coils to cause relative motion between the armature and the stator; and,
an inductive position sense circuit connected to the controlled supply voltage, the pulse width modulation circuit and to the pair of series connected stator coils of the operatively associated linear actuator for synchronously demodulating voltages established across the pair of coils and generating a differential voltage signal as said feedback signal, and further including second offset means to compensate for current flowing in said pair of series connected coils to generate a compensated feedback signal.

14. The apparatus according to claim 11 wherein said inductive position sense circuit includes circuit means for signal correction to compensate for residual flux hysteresis in said stator coils.

15. A method of developing a feedback signal comprising:
providing an actuator including a first coil and a second coil, each of the first and second coils being series connected at a node and adapted for inducing motion in a magnetic field sensitive member;
applying a modulated signal across said series connected first and second coils;
while applying said modulated signal, sensing a signal at said node; and,
generating a feedback signal based on a relation between said modulated signal and said node signal.

16. The method according to claim 15 wherein:
the step of applying said modulated signal includes applying said modulated signal across said series connected first and second coils for a first time period; and, the step of sensing said node signal includes sensing said node signal at said node during said first time period.

17. The method according to claim 15 wherein:

the step of applying said modulated signal includes applying a first alternating voltage across said series connected first and second coils;

the step of sensing said node signal includes demodulating said node signal at said node in synchronism with said first alternating voltage; and, the step of generating said feedback signal includes generating a position feedback signal indicating a position of said magnetic field sensitive member in relation to said first and second coils based upon said demodulated node voltage.

18. The method according to claim 17 further comprising the steps of:

sensing a current flow through said series connected first and second coils as a first current signal;

demodulating said first current signal in synchronism with said first alternating voltage; and, generating a second feedback signal based on a phase relation between said first alternating voltage and said first current signal.

19. A method of developing a transient reversed command feedback signal in an actuator during a period between a first command signal and a second command signal, the actuator including a first coil and a second coil, each of the first and second coils being series connected at a node and adapted for inducing motion in a magnetic field sensitive member, the method comprising the steps of:

applying a first alternating voltage across said series connected first and second coils;

sensing a first current through said series connected first and second coils as a first current signal;

applying a second alternating voltage across said series connected first and second coils;

sensing a second current through said series connected first and second coils at said node as a second current signal;

demodulating said second current signal in synchronism with said second voltage; and, generating a reversal command feedback signal based on a phase relation between said second A.C. voltage and said second current signal whereby the feedback signal represents a reversal of a commanded position from said first alternating voltage to said second alternating voltage.

* * * * *